(No Model.)
T. W. TALIAFERRO.
HAM COOKER.
No. 580,019. Patented Apr. 6, 1897.
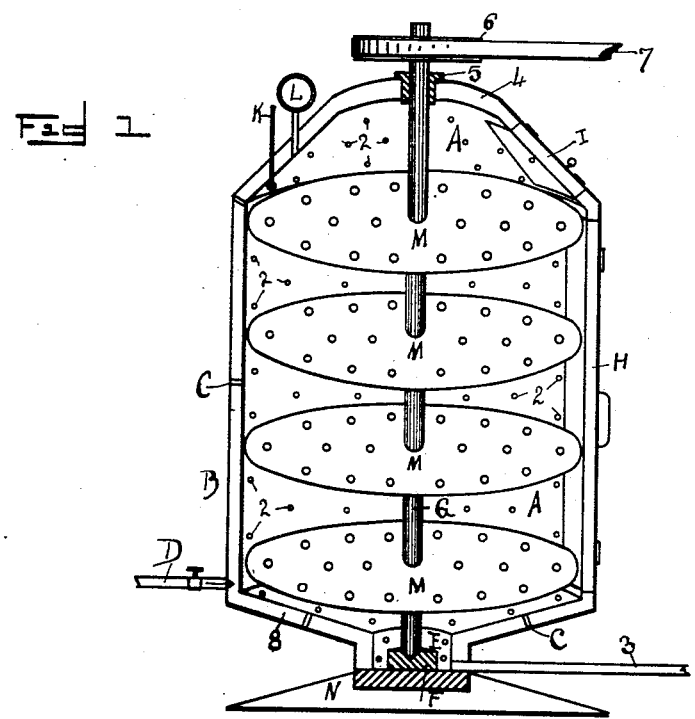
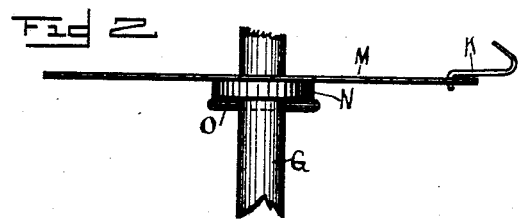
WITNESSES:
Thomas W. Taliaferro
INVENTOR
BY
ATTORNEY.

UNITED STATES PATENT OFFICE.

THOMAS W. TALIAFERRO, OF SOUTH OMAHA, NEBRASKA.

HAM-COOKER.

SPECIFICATION forming part of Letters Patent No. 580,019, dated April 6, 1897.

Application filed October 13, 1896. Serial No. 608,720. (No model.)

*To all whom it may concern:*

Be it known that I, THOMAS W. TALIAFERRO, residing at South Omaha, in the county of Douglas and State of Nebraska, have invented certain useful Improvements in Ham-Cookers; and I do hereby declare that the following is a full, clear, and exact description of the invention, such as will enable others skilled in the art to which it appertains to make and use the same, reference being had to the accompanying drawings, which form a part of this specification.

This invention has relation to a novel improvement in ham-cookers.

The object of my invention is to provide a ham-cooker by means of which the hams may be thoroughly boiled, but at the lowest possible temperature, so that the juices in the hams are preserved and retained while cooked, which tends to keep the hams from shrinking in weight and at the same time preserves them. I further aim to provide a cheap device, as in packing-house economy the cost of preserving the material is of vital importance. So also are the hams which are cooked according to my method preserved in their original shape, there being no warping or excessive shrinkage of the meat, which of course adds to their selling qualities.

In the accompanying drawings, Figure 1 shows a central sectional view of a ham-cooker embodying my invention, while Fig. 2 shows an enlarged broken detail of the method of supporting the revolving tables used in my ham-cooker.

As stated, the aim of my invention is to provide a cheap means of cooking hams and a means to insure their being uniformly cooked at a low temperature to save shrinkage of the hams.

My invention comprises, essentially, a cooking-chamber A, which chamber is provided with a series of perforations 2, which are evenly distributed throughout the chamber A. Surrounding this chamber A is an outer jacket B, secured thereto by suitable stay-bolts C, and into which jacket extends a live-steam pipe D, so that the steam is permitted to enter between the jacket and escape through the perforations to enter the ham-cooker proper. Below I provide a dished or removed portion E within my ham-cooker proper, from which extends a pipe 3, which is used to collect the condensed vapors and carry them off. Within this depression E is positioned a bearing F, within which bearing is rotatably held a main operating-shaft G, which extends through the top 4 of the cooker proper, being held within the bearing 5 and provided above with a pulley 6 in belt connection 7 with a suitable rotary power.

The bottom 8 of my ham-cooker proper is made inclined, so that the condensed vapors may collect within the depression E and be carried off. At suitable points I provide a large door H and a smaller door I, which are practically steam-tight and are also hollow, so that the steam escaping from the pipe D completely surrounds the cooker A and escapes into this chamber through the numerous openings or perforations thereof.

A thermometer K and a gage L aid in regulating the temperature and pressure within the cooker.

Secured to the main shaft G are a number of perforated tables M, upon which the hams to be cooked are placed. Now in operation I prefer placing the larger hams nearest the top of the cooker and upon the upper shelves or revolving perforated tables and the lighter-weight hams upon the lower tables. The perforated tables are then slowly revolved by means of a suitable driving mechanism and in this revolving condition are rotated within an atmosphere of steam at a low pressure but of an even temperature, the rotary movement of the perforated tables insuring an agitation of the steam and bringing the hams into contact with the greatest number of units of heat in a given time. These tables M are supported upon a ring N, which ring N in turn is supported by an ordinary pin O, which pin is driven through the shaft G, as is shown in Fig. 2. All of the tables are arranged in this manner.

The tables M and the ring N are revolubly held and supported by means of the pin O. This is of great convenience in that in order to economize in the construction and cost of equipment the shaft G is continuously revolved. Now if at any time I wish to place or replace hams upon any of the shelves, which is necessary because a large ham requires a little longer time to cook than a small ham, I simply open the door H, insert a hook K (shown in Fig. 2) into one of the openings of the table, and catch the hook in the side or door opening, when this particular table will stop revolving. All the other tables, however, will keep revolving and be carried within the steam-chamber, but this particular interrupted table slides upon its collar N, and when the hams at that point have been removed the hook is taken out and placed in a new opening, when the table is again halted without in any way interfering with the operation of the rest of the tables. This is of great convenience in that any set of hams upon any one of the tables can be removed or replaced without interfering with the operation of the remaining tables. The friction between the table M, the collar N, and the pin O of course tends to revolve these tables.

The practice is to cook the hams within a temperature of about one hundred and eighty degrees, more or less, depending on the average weight of the meat to be cooked, for about five hours, during all of which time they are gently revolved. This temperature can of course be slightly raised, though it is to advantage to cook the hams at the lowest possible temperature to prevent the escape of the juices. By having a low temperature a low pressure of course is also insured, which also contributes toward the preservation of the hams in the best possible form. They will not overcook and need no watching.

It should be here stated that the outer jacket C could be dispensed with and the steam be admitted directly into the chamber in which the hams revolve, but by means of the multiplicity of the openings a great number of small steam-jets escape into the cooker at all points, which greatly facilitate the operation of my device.

While I have shown a cylindrical housing provided with approximately conical-shaped tops and bottoms secured to a suitable base M, it is of course understood that the conformation of the cooker could be changed without departing from the spirit of my invention.

Now, having thus described my said invention, what I claim as new, and desire to be secured by United States Letters Patent, is—

1. A ham-cooker comprising a perforated chamber, a shaft rotatable within said chamber, a series of perforated tables, a jacket surrounding said chamber, a steam-supply entering said chamber, and a drain extending from said jacket, all arranged substantially as and for the purpose set forth.

2. In a ham-cooker, a perforated housing, a jacket surrounding said housing, a steam-supply entering said jacket, a drain at the bottom of said housing, doors communicating with said perforated housing, a shaft revolving within said perforated housing, a series of perforated tables, revolved by said shaft, temperature and pressure regulating mechanisms in conjunction with said perforated housing, all adapted to operate substantially as and for the purpose set forth.

3. In a ham-cooker, a suitable housing, a vertical shaft rotatable within said housing, a steam-supply entering said housing, a drain extending from said housing, a series of pins passing through said vertical shaft and a series of perforated tables working revolubly upon said pins and about said shaft, so that said tables may be checked independent of the rotation of said vertical shaft, substantially as and for the purpose set forth.

In testimony whereof I affix my signature in presence of two witnesses.

THOMAS W. TALIAFERRO.

Witnesses:
D. E. TRACY,
GEO. M. LAWRENCE.